US012627459B2

(12) United States Patent
Ibrahim et al.

(10) Patent No.: US 12,627,459 B2
(45) Date of Patent: May 12, 2026

(54) SUB-BAND FULL-DUPLEX GRANULARITY

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 18/358,746

(22) Filed: Jul. 25, 2023

(65) Prior Publication Data

US 2025/0038938 A1     Jan. 30, 2025

(51) Int. Cl.
H04L 5/14          (2006.01)

(52) U.S. Cl.
CPC ....................................... H04L 5/14 (2013.01)

(58) Field of Classification Search
CPC ......... H04L 5/14; H04L 5/0007; H04L 5/001; H04L 5/0092; H04L 5/1469
See application file for complete search history.

(56) References Cited

U.S. PATENT DOCUMENTS

| | | | | |
|---|---|---|---|---|
| 11,595,983 | B2 * | 2/2023 | Hosseini | H04W 72/0446 |
| 2021/0352667 | A1 * | 11/2021 | Abotabl | H04W 72/0446 |
| 2023/0074563 | A1 * | 3/2023 | Sakhnini | H04W 72/0446 |
| 2023/0076156 | A1 * | 3/2023 | Abotabl | H04K 3/41 |
| 2023/0284212 | A1 * | 9/2023 | Ibrahim | H04L 1/1664 370/329 |
| 2023/0354320 | A1 * | 11/2023 | Papasakellariou | H04W 72/1268 |
| 2024/0056153 | A1 * | 2/2024 | Ibrahim | H04L 5/001 |
| 2024/0291630 | A1 * | 8/2024 | Zhou | H04W 72/23 |
| 2024/0334220 | A1 * | 10/2024 | Zhang | H04L 5/14 |

OTHER PUBLICATIONS

Ericsson: "Sub-band Non-overlapping Full Duplex", 3GPP TSG-RAN WG1 Meeting #113, Tdoc R1-2304792, Type Discussion, FS_NR_ Duplex_Evo, 3rd Generation Partnership Project (3GPP), Mobile Competence Centre, 650, Route Des Lucioles, F-06921 Sophia-Antipolis Cedex, France, vol. 3GPP RAN 1, No. Incheon, KR, May 22, 2023-May 26, 2023, May 15, 2023, 38 Pages, XP052310248, section 2.1.
International Search Report and Written Opinion—PCT/US2024/035357—ISA/EPO—Oct. 11, 2024.

(Continued)

*Primary Examiner* — Bailor C Hsu
(74) *Attorney, Agent, or Firm* — Harrity & Harrity, LLP

(57)          ABSTRACT

Various aspects of the present disclosure generally relate to wireless communication. In some aspects, a user equipment (UE) may receive a sub-band full-duplex (SBFD) pattern indication that indicates an SBFD pattern for an SBFD resource. The UE may identify a time domain granularity and a frequency domain granularity for the SBFD resource based at least in part on the SBFD pattern indication. The UE may communicate via the SBFD resource in accordance with the time domain granularity and the frequency domain granularity. Numerous other aspects are described.

30 Claims, 9 Drawing Sheets

600

(56)                    References Cited

OTHER PUBLICATIONS

Lenovo: "Subband Non-overlapping Full Duplex", 3GPP TSG RAN WG1 Meeting #113, R1-2305208, Type Discussion, FS_NR_Duplex Evo, 3rd Generation Partnership Project (3GPP), Mobile Competence Centre, 650, Route Des Lucioles, F-06921 Sophia-Antipolis Cedex, France, vol. 3GPP RAN 1, No. Incheon, KR, May 22, 2023-May 26, 2023, 11 Pages, May 15, 2023, XP052310650, Section 2.

Xiaomi: "Discussion on Subband Non-overlapping Full Duplex", 3GPP TSG RAN WG1 #113, R1-2304900, Type Discussion, FS_NR_Duplex_Evo, 3rd Generation Partnership Project (3GPP), Mobile Competence Centre, 650, Route Des Lucioles, F-06921 Sophia-Antipolis Cedex, France, vol. 3GPP RAN 1, No. Incheon, KR, May 22, 2023-May 26, 2023, May 15, 2023, 41 Pages, XP052310355, sections 2.1-2.2.

ZTE: "Discussion of Subband Non-overlapping Full Duplex" 3GPP TSG RAN WG1 #113, R1-2304596, Type Discussion, FS_NR_Duplex_Evo, 3rd Generation Partnership Project (3GPP), Mobile Competence Centre, 650, Route Des Lucioles, F-06921 Sophia-Antipolis Cedex, France, vol. 3GPP RAN 1, No. Incheon, KR, May 22, 2023-May 26, 2023, May 15, 2023, 25 Pages, XP052310055, sections 2.1-2.2.

* cited by examiner

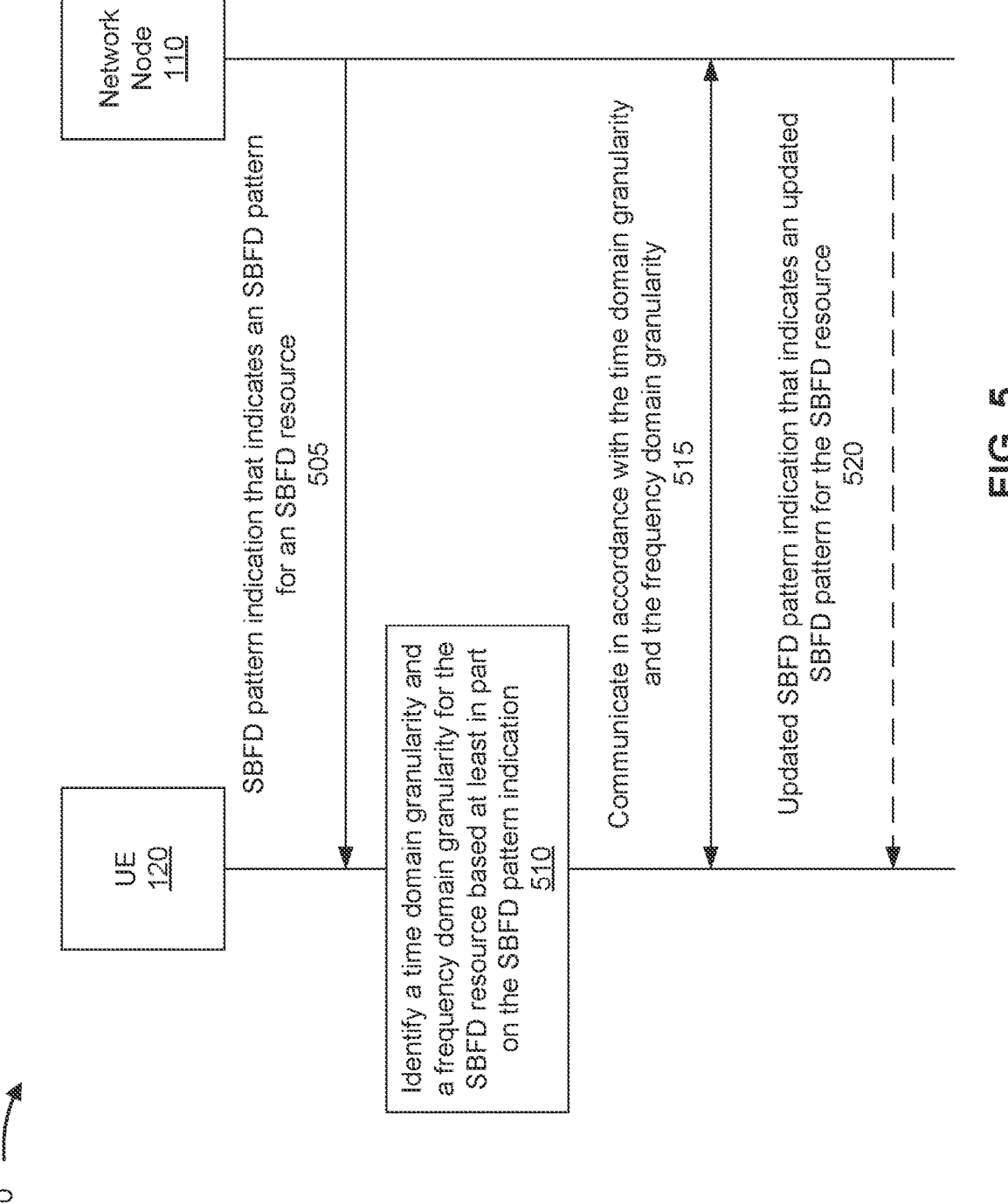

Network Node 110

UE 120

SBFD pattern indication that indicates an SBFD pattern for an SBFD resource
505

Identify a time domain granularity and a frequency domain granularity for the SBFD resource based at least in part on the SBFD pattern indication
510

Communicate in accordance with the time domain granularity and the frequency domain granularity
515

Updated SBFD pattern indication that indicates an updated SBFD pattern for the SBFD resource
520

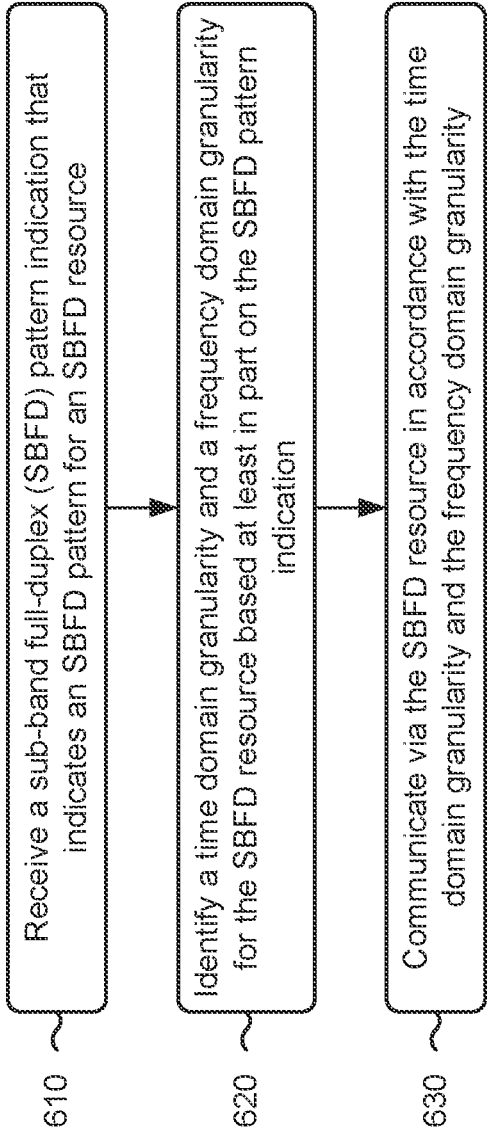

Receive a sub-band full-duplex (SBFD) pattern indication that indicates an SBFD pattern for an SBFD resource

610

Identify a time domain granularity and a frequency domain granularity for the SBFD resource based at least in part on the SBFD pattern indication

620

Communicate via the SBFD resource in accordance with the time domain granularity and the frequency domain granularity

710 — Transmit an SBFD pattern indication that indicates an SBFD pattern for an SBFD resource 720 — Communicate via the SBFD resource in accordance with a time domain granularity and a frequency domain granularity for the SBFD resource that are based at least in part on the SBFD pattern indication

SUB-BAND FULL-DUPLEX GRANULARITY

FIELD OF THE DISCLOSURE

Aspects of the present disclosure generally relate to wireless communication and to techniques and apparatuses for sub-band full-duplex granularity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a sub-band full-duplex (SBFD) pattern indication that indicates an SBFD pattern for an SBFD resource. The method may include identifying a time domain granularity and a frequency domain granularity for the SBFD resource based at least in part on the SBFD pattern indication. The method may include communicating via the SBFD resource in accordance with the time domain granularity and the frequency domain granularity.

Some aspects described herein relate to a method of wireless communication performed by a network node. The method may include transmitting an SBFD pattern indication that indicates an SBFD pattern for an SBFD resource. The method may include communicating via the SBFD resource in accordance with a time domain granularity and a frequency domain granularity for the SBFD resource that are based at least in part on the SBFD pattern indication.

Some aspects described herein relate to a UE for wireless communication. The UE may include one or more memories and one or more processors coupled to the one or more memories. The one or more processors may be configured, individually or in any combination, to receive an SBFD pattern indication that indicates an SBFD pattern for an SBFD resource. The one or more processors may be configured, individually or in any combination, to identify a time domain granularity and a frequency domain granularity for the SBFD resource based at least in part on the SBFD pattern indication. The one or more processors may be configured, individually or in any combination, to communicate via the SBFD resource in accordance with the time domain granularity and the frequency domain granularity.

Some aspects described herein relate to a network node for wireless communication. The network node may include one or more memories and one or more processors coupled to the one or more memories. The one or more processors may be configured, individually or in any combination, to transmit an SBFD pattern indication that indicates an SBFD pattern for an SBFD resource. The one or more processors may be configured, individually or in any combination, to communicate via the SBFD resource in accordance with a time domain granularity and a frequency domain granularity for the SBFD resource that are based at least in part on the SBFD pattern indication.

Some aspects described herein relate to a non-transitory computer-readable medium that stores a set of instructions for wireless communication by a UE. The set of instructions, when executed by one or more processors of the UE, may cause the UE to receive an SBFD pattern indication that indicates an SBFD pattern for an SBFD resource. The set of instructions, when executed by one or more processors of the UE, may cause the UE to identify a time domain granularity and a frequency domain granularity for the SBFD resource based at least in part on the SBFD pattern indication. The set of instructions, when executed by one or more processors of the UE, may cause the UE to communicate via the SBFD resource in accordance with the time domain granularity and the frequency domain granularity.

Some aspects described herein relate to a non-transitory computer-readable medium that stores a set of instructions for wireless communication by a network node. The set of instructions, when executed by one or more processors of the network node, may cause the network node to transmit an SBFD pattern indication that indicates an SBFD pattern for an SBFD resource. The set of instructions, when executed by one or more processors of the network node, may cause the network node to communicate via the SBFD resource in accordance with a time domain granularity and a frequency domain granularity for the SBFD resource that are based at least in part on the SBFD pattern indication.

Some aspects described herein relate to an apparatus for wireless communication. The apparatus may include means for receiving an SBFD pattern indication that indicates an SBFD pattern for an SBFD resource. The apparatus may include means for identifying a time domain granularity and a frequency domain granularity for the SBFD resource based at least in part on the SBFD pattern indication. The apparatus may include means for communicating via the SBFD resource in accordance with the time domain granularity and the frequency domain granularity.

Some aspects described herein relate to an apparatus for wireless communication. The apparatus may include means for transmitting an SBFD pattern indication that indicates an SBFD pattern for an SBFD resource. The apparatus may include means for communicating via the SBFD resource in accordance with a time domain granularity and a frequency domain granularity for the SBFD resource that are based at least in part on the SBFD pattern indication.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of sub-band full-duplex (SBFD) granularity for SBFD communications, in accordance with the present disclosure.

FIG. 6 is a diagram illustrating an example process performed, for example, by a UE, in accordance with the present disclosure.

DETAILED DESCRIPTION

Figure 1:
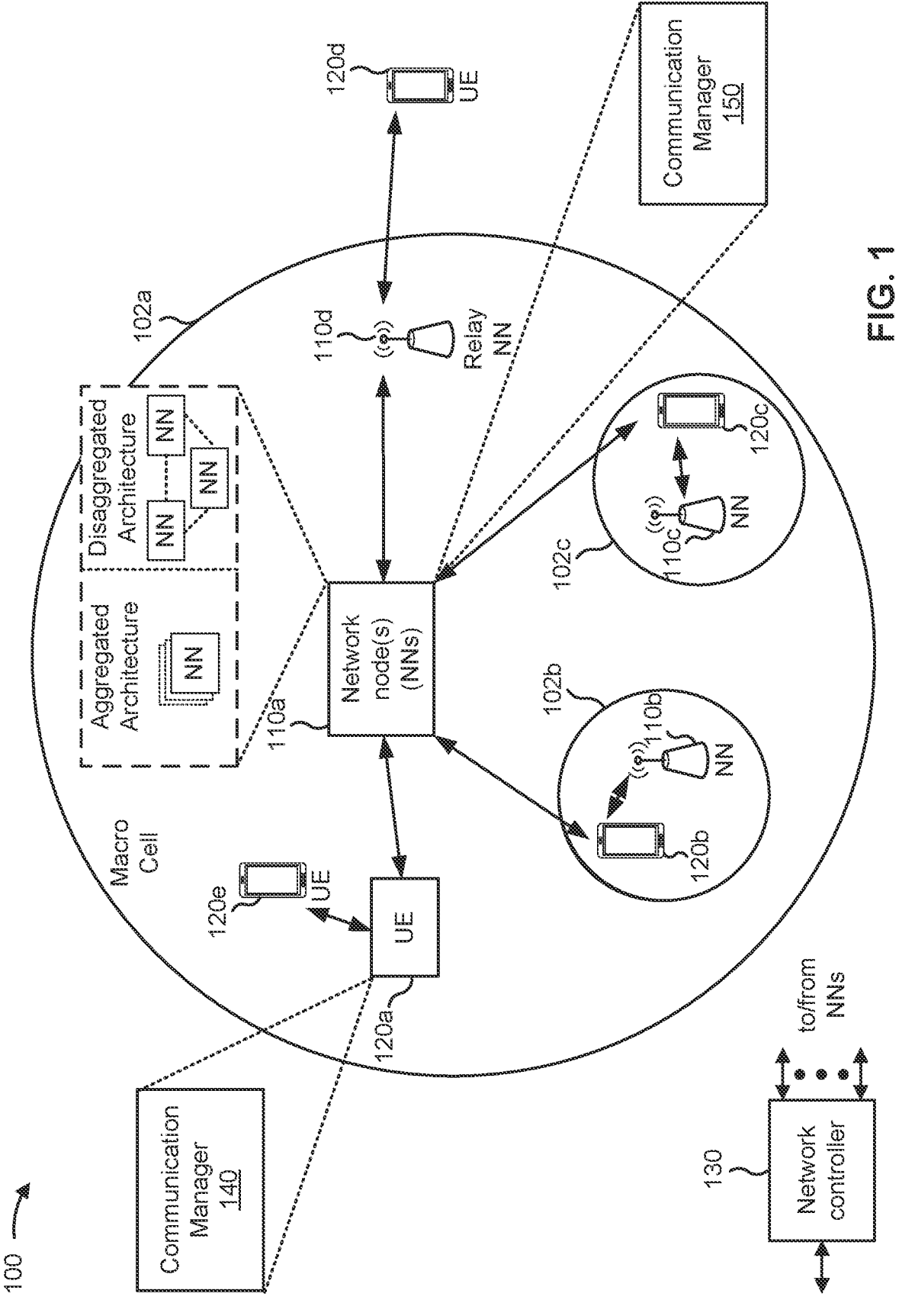
FIG. 1 is a diagram illustrating an example of a wireless network, in accordance with the present disclosure.

A sub-carrier spacing (SCS) of a bandwidth part (BWP) may be greater than or equal to an SCS of a time division duplexing (TDD) uplink (UL) downlink (DL) (TDD-UL-DL) configuration. Additionally, the SCS of the BWP may be greater than or equal to an SCS of a slot format indicator (SFI). The SCS of the BWP being greater than the SCS of the TDD-UL-DL configuration may result in one or more slot types being repeated. For example, a DDDU pattern (where D corresponds to a downlink resource and U corresponds to an uplink resource) for 30 kilohertz (kHz) SCS may become DDDDDDUU for 60 kHz SCS. In a first example, for indicating an SBFD pattern in a time domain, an SCS of an SBFD pattern may be the same as the SCS of the TDD-UL-DL configuration. In a second example, for indicating the SBFD pattern in the time domain, the SCS of the SBFD pattern may be different than the SCS of the TDD-UL-DL configuration. In some cases, a user equipment (UE) and a network node may not be able to determine whether the SCS for the SBFD resource is to be the same in the time domain and in the frequency domain, or whether the SCS for the SBFD resource is to be different in the time domain than in the frequency domain. Additionally, or alternatively, the UE and the network node may not be able to determine a time domain granularity and a frequency domain granularity for an SBFD pattern of the SBFD resource.

Various aspects generally relate to wireless communications. Some aspects more specifically relate to identifying an SBFD granularity for SBFD communications. In some examples, a network node may transmit, and a UE may receive, an SBFD pattern indication that indicates an SBFD pattern for an SBFD resource. In some examples, the SBFD pattern may be a semi-static SBFD pattern that is included in a cell common configuration. In some other examples, the SBFD pattern may be a semi-static SBFD pattern that is included in a UE-specific configuration. In some examples, the SBFD pattern may be a slot-based SBFD pattern. In some other examples, the SBFD pattern may be a symbol-based SBFD pattern. The UE may identify a time domain granularity and a frequency domain granularity for the SBFD resource based at least in part on the SBFD pattern indication. The UE and the network node may communicate via the SBFD resource in accordance with the time domain granularity and the frequency domain granularity. In some examples, the network node may transmit, and the UE may receive, an updated SBFD pattern via dynamic signaling (such as Layer 1 or Layer 2 signaling). The UE may identify an updated time domain granularity and an updated frequency domain granularity for the SBFD resource in accordance with the updated SBFD pattern, and the UE and the network node may communicate via the SBFD resource in accordance with the updated time domain granularity and the updated frequency domain granularity.

Particular aspects of the subject matter described in this disclosure can be implemented to realize one or more of the following potential advantages. In some examples, by communicating the SBFD pattern indication that indicates the SBFD pattern for the SBFD resource, the described techniques can be used to enable a UE to identify a time domain granularity and a frequency domain granularity for the SBFD resource. Additionally, by identifying the time domain granularity and the frequency domain granularity for the SBFD resource, the described techniques can be used to enable the UE and a network node to determine whether the SCS for the SBFD resource is to be the same in the time domain and in the frequency domain, or whether the SCS for the SBFD resource is to be different in the time domain than in the frequency domain. This may improve communications on the SBFD resource and may result in fewer missed communications on the SBFD resource. These example advantages, among others, are described in more detail below.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an SBFD pattern indication that indicates an SBFD pattern for an SBFD resource; identify a time domain granularity and a frequency domain granularity for the SBFD resource based at least in part on the SBFD pattern indication; and communicate via the SBFD resource in accordance with the time domain granularity and the frequency domain granularity. Additionally, or alternatively, the communication manager 140 may perform one or more other operations described herein.

In some aspects, the network node 110 may include a communication manager 150. As described in more detail elsewhere herein, the communication manager 150 may transmit an SBFD pattern indication that indicates an SBFD pattern for an SBFD resource; and communicate via the SBFD resource in accordance with a time domain granularity and a frequency domain granularity for the SBFD resource that are based at least in part on the SBFD pattern indication. Additionally, or alternatively, the communication manager 150 may perform one or more other operations described herein.

As indicated above, FIG. 1 is provided as an example. Other examples may differ from what is described with regard to FIG. 1.

Figure 2:
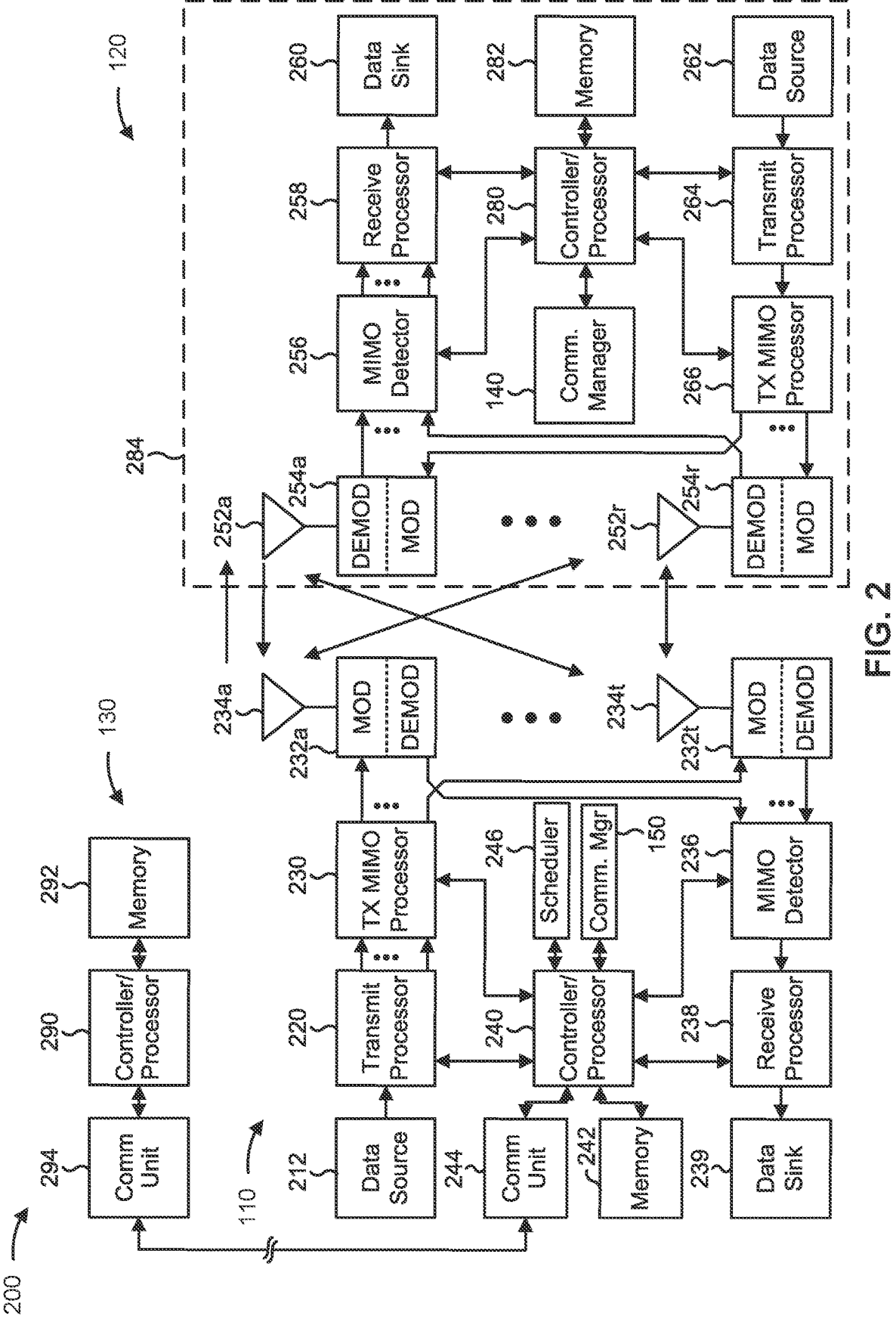
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the network node 110, the controller/processor 280 of the UE 120, and/or any other component(s) of FIG. 2 may perform one or more techniques associated with SBFD granularity, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for receiving an SBFD pattern indication that indicates an SBFD pattern for an SBFD resource; means for identifying a time domain granularity and a frequency domain granularity for the SBFD resource based at least in part on the SBFD pattern indication; and/or means for communicating via the SBFD resource in accordance with the time domain granularity and the frequency domain granularity. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting an SBFD pattern indication that indicates an SBFD pattern for an SBFD resource; and/or means for communicating via the SBFD resource in accordance with a time domain granularity and a frequency domain granularity for the SBFD resource that are based at least in part on the SBFD pattern indication. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
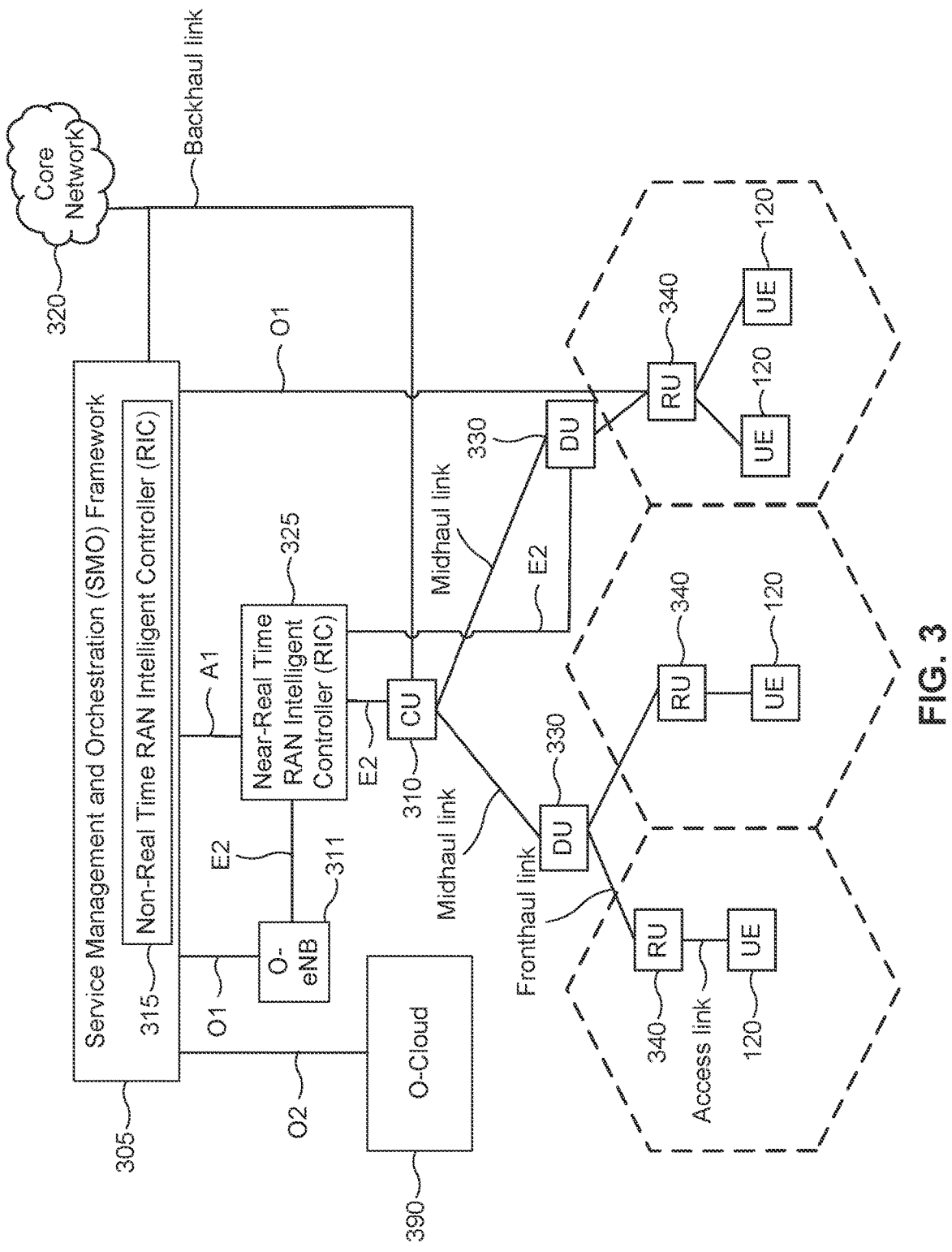
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
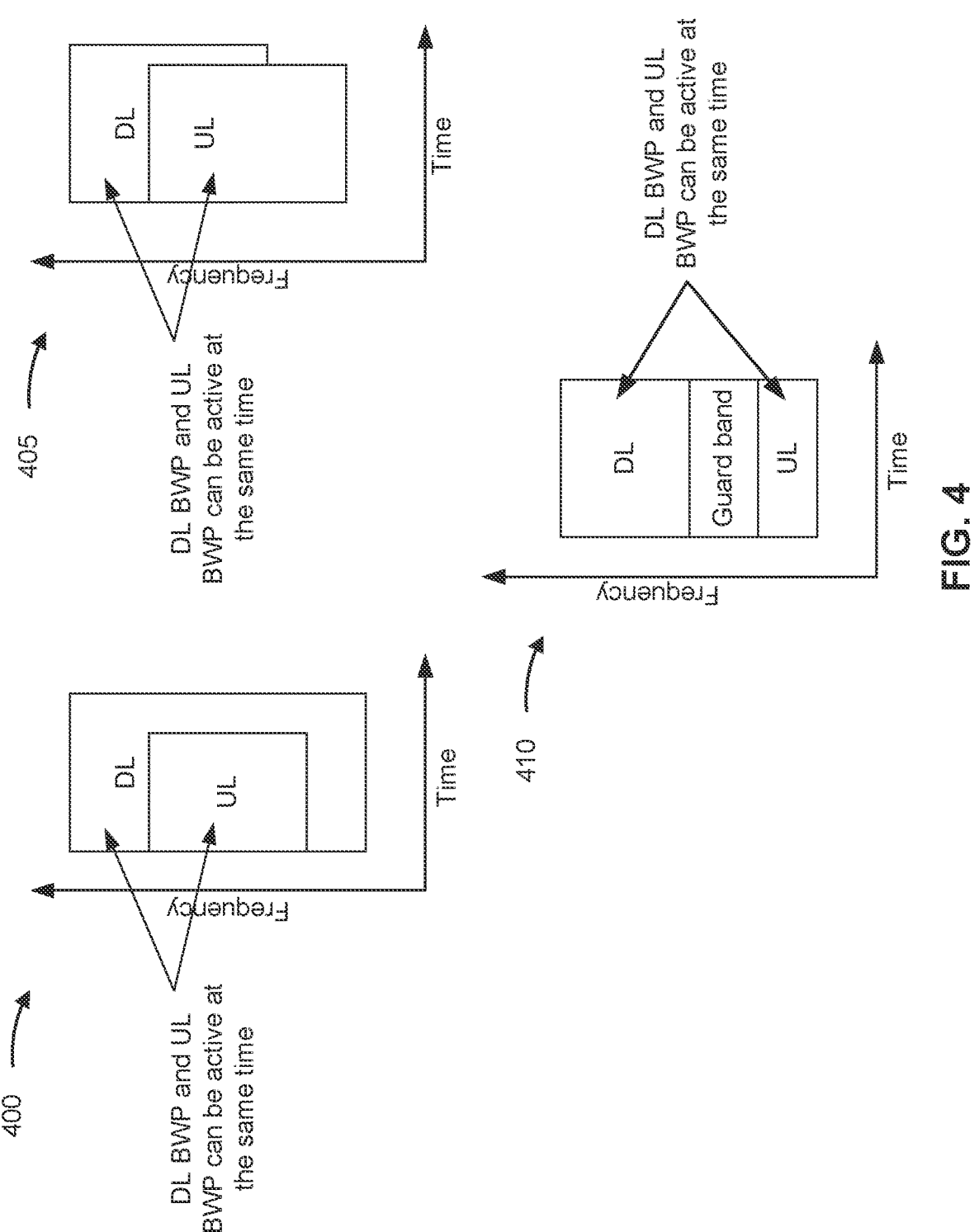
FIG. 4 is a diagram illustrating examples of full-duplex communication in a wireless network, in accordance with the present disclosure.

FIG. 4 is a diagram illustrating examples 400, 405, and 410 of full-duplex communication in a wireless network, in accordance with the present disclosure. Full-duplex (FD) communication in a wireless network refers to simultaneous bi-directional communication between devices in the wireless network. For example, a UE operating in a full-duplex mode may transmit an uplink communication and receive a downlink communication at the same time (e.g., in the same slot or the same symbol). Half-duplex (HD) communication in a wireless network refers to unidirectional communications (e.g., only downlink communication or only uplink communication) between devices at a given time (e.g., in a given slot or a given symbol).

As shown in FIG. 4, examples 400 and 405 show examples of in-band full-duplex (IBFD) communication. In IBFD, a UE may transmit an uplink communication to a base station and receive a downlink communication from the base station on the same time and frequency resources. As shown in example 400, in a first example of IBFD, the time and frequency resources for uplink communication may fully overlap with the time and frequency resources for downlink communication. As shown in example 405, in a second example of IBFD, the time and frequency resources for uplink communication may partially overlap with the time and frequency resources for downlink communication.

As further shown in FIG. 4, example 410 shows an example of sub-band full-duplex (SBFD) communication, which may also be referred to as sub-band frequency division duplex (SBFDD) or flexible duplex. In SBFD, a UE may transmit an uplink communication to a base station and receive a downlink communication from the base station at the same time, but on different frequency resources. For example, the different frequency resources may be sub-bands of a frequency band, such as a time division duplexing band. In this case, the frequency resources used for downlink communication may be separated from the frequency resources used for uplink communication, in the frequency domain, by a guard band.

In some cases, such as for semi-static SBFD, in order to avoid frequent switching between SBFD and non-SBFD symbols, a limitation on a maximum number of transition points between SBFD and non-SBFD symbols may be considered. For example, a maximum of two transition points, including one transition point from non-SBFD symbols to SBFD symbols and one transition point from SBFD symbols to non-SBFD symbols, within a TDD UL/DL pattern period may be considered, where the transition point is to be aligned with a slot boundary or within a slot. In some cases, a guard period (e.g., a guard band) between SBFD and non-SBFD symbols may be used at the network node and/or at the UE, for example, in accordance with network node or UE implementation and/or in accordance with SBFD operations. In some cases, a reference SCS configured in a TDD-UL-DL pattern in a cell configuration may be less than or equal to an SCS of a BWP. In some cases, a UE may expect that a reference SCS configuration $\mu_{ref}$ is less than or equal to an SCS configuration $\mu$ for any configured DL BWP or UL BWP. Each slot provided by a first pattern (pattern1) or a second pattern (pattern2) may be applicable to $2^{(\mu-\mu_{ref})}$ consecutive slots in the active DL BWP or the active UL BWP, where the first slot starts at a same time as a first slot for the reference SCS configuration $\mu_{ref}$ and each downlink, flexible, or uplink symbol for the reference SCS configuration $\mu_{ref}$ corresponds to $2^{(\mu-\mu_{ref})}$ consecutive downlink, flexible, or uplink symbols for the SCS configuration p. Additionally, an SCS of a BWP may be greater than or equal to an SCS of a slot format indicator (SFI).

As indicated above, FIG. 4 is provided as an example. Other examples may differ from what is described with respect to FIG. 4.

FIG. 5 is a diagram illustrating an example 500 of SBFD granularity for SBFD communications, in accordance with the present disclosure. In some aspects, an SBFD time domain pattern may determine a location of SBFD slots or symbols (or HD slots or symbols). Additionally, or alternatively, a granularity of the time domain pattern may be defined based at least in part on a reference SCS.

As shown by reference number 505, the network node 110 may transmit, and the UE 120 may receive, an SBFD pattern indication that indicates an SBFD pattern for an SBFD resource. In a first example, the SBFD pattern indication may be included in a cell common configuration. For example, the network node 110 may transmit, and the UE 120 may receive, a serving cell configuration common indication (ServingCellConfigCommon) that includes an indication of the SBFD pattern and that includes a TDD-UL-DL configuration common indication (TDD-UL-DL-ConfigCommon). In a second example, the SBFD pattern indication may be included in a UE-specific configuration. For example, the network node 110 may transmit, and the UE 120 may receive, a TDD-UL-DL configuration dedicated indication (TDD-UL-DL-ConfigDedicated) that includes an indication of the SBFD pattern.

As shown by reference number 510, the UE 120 may identify a time domain granularity and a frequency domain granularity for the SBFD resource. The UE 120 may identify the time domain granularity and the frequency domain granularity for the SBFD resource based at least in part on the SBFD pattern indication.

As described in the first example above, the UE 120 may receive a serving cell configuration common indication that includes an indication of the SBFD pattern and that includes a TDD-UL-DL configuration common indication. In some aspects, the time domain granularity for the SBFD resource may be based at least in part on (e.g., may be the same as) a reference SCS defined in the TDD-UL-DL configuration common indication. Additionally, the SCS of the SBFD resource in the frequency domain (e.g., for determining downlink bands, uplink bands, or guard bands in the SBFD slot) may be different than the SCS of the active BWP. In some other aspects, the time domain granularity for the SBFD resource may be independent of the SCS that is used to define the frequency domain resources of the uplink bands, downlink bands, and guard bands. Thus, the time domain granularity for the SBFD resource may be based at least in part on (e.g., may be the same as) the time domain granularity for the TDD-UL-DL resource, and the frequency resources (e.g., the frequency domain granularity) may be separately defined. For example, a separate SCS may be used for defining the DL and UL sub-bands.

As described in the second example above, the UE 120 may obtain or receive a UE-specific configuration that includes an indication of the SBFD pattern. In some aspects, the indication of the SBFD pattern may be included in a TDD-UL-DL configuration dedicated indication (TDD-UL-DL-ConfigDedicated). In this case, an SCS associated with the TDD-UL-DL configuration dedicated indication may be the same as a reference SCS associated with the TDD-UL-DL configuration common indication. For example, the time domain granularity for the SBFD resource may be based at least in part on the reference SCS defined in the TDD-UL-DL configuration dedicated indication, and the SCS of the SBFD resource in the frequency domain for determining downlink bands, uplink bands, or guard bands in the SBFD slot may be different than the SCS of the active BWP. Alternatively, the time domain granularity for the SBFD resource may be based at least in part on the time domain granularity for the TDD-UL-DL resource, and the frequency resources may be separately defined. In some other aspects, the SBFD time domain pattern may be defined in accordance with a serving cell configuration (ServingCeliConfig). In this case, a separate SCS may be defined for the SBFD time domain pattern, where the BWP SCS is greater than or equal to the SBFD reference SCS. In one example, no condition may be placed on the SBFD SCS relative to the TDD-UL-DL configuration common indication. In another example, the SBFD SCS may be greater than or equal to the reference SCS of the TDD-UL-DL configuration common indication. If the SBFD SCS ($\mu_{SBFD}$) is greater than the reference SCS of the TDD-UL-DL ($\mu_{ref}$), then every slot in the TDD-UL-DL corresponds to $2^{\mu SBFD-\mu ref}$ slots in the SBFD pattern. For example, for TDD $\mu_{ref}=0$, SBFD $\mu_{SBFD}=1$, and BWP SCS $\mu=2$, every slot in the TDD corresponds to two slots in the SBFD pattern, and every slot in the SBFD pattern corresponds to two slots in the BWP slots. For example, TDD format "DU" and if each SBFD slot indication is 0100, the final bandwidth pattern may be DDXXUUUU, where X is an SBFD slot.

In some aspects, the SBFD pattern indication may be a slot-based SBFD pattern indication. This may not allow for slots with mixed symbol types (e.g., D and SBFD symbols). In some other aspects, the SBFD pattern indication may be a symbol-based SBFD pattern indication. This may allow for more flexibility, but may use a long bitmap or start-end indication for indicating the pattern, which may result in increased overhead. In some other aspects, the SBFD pattern indication may be (or may include) a window which contains a slot-based indication and a symbol-based indication. The window may be defined based at least in part on a maximum number of switching points between TDD and SBFD. In one example, a slot-based SBFD window may be defined based at least in part on a start indication and a length indication, or based at least in part on a start indication and an end indication, and a symbol-based SBFD window may be defined based at least in part on a length indication. This may assume that the symbol-based SBFD window starts directly after the slot-based SBFD window. In another example, a slot-based SBFD window may be defined based at least in part on a start indication and a length indication, or based at least in part on a start indication and an end indication, and a symbol-based SBFD window may be defined based at least in part on a bitmap for transition slots.

As shown by reference number 515, the UE 120 and the network node 110 may communicate via the SBFD resource in accordance with the time domain granularity and the frequency domain granularity.

As shown by reference number 520, the network node 110 may transmit, and the UE 120 may receive, an updated SBFD pattern indication that indicates an updated SBFD pattern for the SBFD resource.

In some aspects, the updated SBFD pattern indication may be a dynamic SBFD update that is based at least in part on an enhancement of an SFI mechanism. For example, the updated SBFD pattern may be defined based at least in part on an SFI of the reference SCS. In some other aspects, the updated SBFD pattern indication may be a dynamic SBFD update that is received via downlink control information (DCI) or a medium access control (MAC) control element (CE) (MAC-CE) (such as dedicated DCI or a dedicated MAC-CE for sending dynamic SBFD updates). The reference SCS of the SBFD pattern may be defined separately, for example, in a radio resource control (RRC) message. In some aspects, the network node 110 may configure a first value that is less than or equal to a value of any SCS of the configured BWPs of the serving cell for which the update applies. Additionally, the network node 110 may configure a second value that is less than or equal to the SCS of the serving cell for which the UE monitors for dynamic SBFD updates. The UE 120 may identify an updated time domain granularity and/or an updated frequency domain granularity for the SBFD resource in accordance with the updated SBFD pattern indication, and the UE 120 and network node 110 may communicate via the SBFD resource in accordance with the updated time domain granularity and/or the updated frequency domain granularity.

As indicated above, FIG. 5 is provided as an example. Other examples may differ from what is described with respect to FIG. 5.

FIG. 6 is a diagram illustrating an example process 600 performed, for example, by a UE, in accordance with the present disclosure. Example process 600 is an example where the UE (e.g., UE 120) performs operations associated with sub-band full-duplex granularity.

As shown in FIG. 6, in some aspects, process 600 may include receiving an SBFD pattern indication that indicates an SBFD pattern for an SBFD resource (block 610). For example, the UE (e.g., using reception component 802 and/or communication manager 806, depicted in FIG. 8) may receive an SBFD pattern indication that indicates an SBFD pattern for an SBFD resource, as described above.

As further shown in FIG. 6, in some aspects, process 600 may include identifying a time domain granularity and a frequency domain granularity for the SBFD resource based at least in part on the SBFD pattern indication (block 620). For example, the UE (e.g., using communication manager 806, depicted in FIG. 8) may identify a time domain granularity and a frequency domain granularity for the SBFD resource based at least in part on the SBFD pattern indication, as described above.

As further shown in FIG. 6, in some aspects, process 600 may include communicating via the SBFD resource in accordance with the time domain granularity and the frequency domain granularity (block 630). For example, the UE (e.g., using reception component 802, transmission component 804, and/or communication manager 806, depicted in FIG. 8) may communicate via the SBFD resource in accordance with the time domain granularity and the frequency domain granularity, as described above.

Process 600 may include additional aspects, such as any single aspect or any combination of aspects described below and/or in connection with one or more other processes described elsewhere herein.

In a first aspect, receiving the SBFD pattern indication comprises receiving a serving cell configuration common indication that includes the SBFD pattern indication and a time division duplexing configuration common indication, wherein the SBFD pattern is a semi-static SBFD pattern.

In a second aspect, alone or in combination with the first aspect, identifying the time domain granularity and the frequency domain granularity for the SBFD resource comprises identifying the time domain granularity in accordance with a reference SCS that is defined in the time division duplexing configuration common indication, and identifying the frequency domain granularity in accordance with an SCS associated with a downlink band, an uplink band, and a guard band of the SBFD resource, wherein the SCS associated with the downlink band, the uplink band, and the guard band of the SBFD resource is different than an SCS of an active bandwidth part associated with a serving cell of the UE.

In a third aspect, alone or in combination with one or more of the first and second aspects, identifying the time domain granularity and the frequency domain granularity for the SBFD resource comprises identifying the time domain granularity in accordance with a time domain granularity indicated in the time division duplexing configuration common indication, and identifying the frequency domain granularity in accordance with a sub-carrier spacing of an uplink sub-band or a downlink sub-band.

In a fourth aspect, alone or in combination with one or more of the first through third aspects, receiving the SBFD pattern indication comprises receiving a UE configuration that includes the SBFD pattern indication, wherein the SBFD pattern is a semi-static SBFD pattern.

In a fifth aspect, alone or in combination with one or more of the first through fourth aspects, identifying the time domain granularity and the frequency domain granularity for the SBFD resource comprises identifying the time domain granularity in accordance with a reference SCS that is defined in a time division duplexing configuration dedicated indication, and identifying the frequency domain granularity in accordance with an SCS associated with a downlink band, an uplink band, and a guard band of the SBFD resource, wherein the SCS associated with the downlink band, the uplink band, and the guard band of the SBFD resource is different than an SCS of an active bandwidth part associated with a serving cell of the UE.

In a sixth aspect, alone or in combination with one or more of the first through fifth aspects, identifying the time domain granularity and the frequency domain granularity for the SBFD resource comprises identifying the time domain granularity in accordance with a time domain granularity indicated in a time division duplexing configuration dedicated indication, and identifying the frequency domain granularity in accordance with a sub-carrier spacing of an uplink sub-band or a downlink sub-band.

In a seventh aspect, alone or in combination with one or more of the first through sixth aspects, identifying the time domain granularity and the frequency domain granularity for the SBFD resource comprises identifying the time domain granularity in accordance with a serving cell configuration, wherein an SCS associated with the SBFD resource is less than a bandwidth part SCS.

In an eighth aspect, alone or in combination with one or more of the first through seventh aspects, the SCS of the SBFD resource is not limited by an SCS indicated in a time division duplexing configuration common indication.

In a ninth aspect, alone or in combination with one or more of the first through eighth aspects, an SCS of the SBFD resource is greater than or equal to a reference SCS indicated in a time division duplexing configuration common indication.

In a tenth aspect, alone or in combination with one or more of the first through ninth aspects, identifying the time domain granularity comprises identifying the time domain granularity in accordance with a slot-based SBFD indication.

In an eleventh aspect, alone or in combination with one or more of the first through tenth aspects, identifying the time domain granularity comprises identifying the time domain granularity in accordance with a symbol-based SBFD indication.

In a twelfth aspect, alone or in combination with one or more of the first through eleventh aspects, identifying the time domain granularity comprises identifying the time domain granularity in accordance with a window that includes a slot-based SBFD indication and a symbol-based SBFD indication, wherein the window is based at least in part on a maximum number of switching points between time division duplexing resources and SBFD resources.

In a thirteenth aspect, alone or in combination with one or more of the first through twelfth aspects, a slot-based SBFD window is defined based at least in part on a start indicator and at least one of a length indicator or an end indicator, and a symbol-based SBFD window is defined based at least in part on another length indicator, wherein the symbol-based SBFD window begins at an end of the slot-based SBFD window.

In a fourteenth aspect, alone or in combination with one or more of the first through thirteenth aspects, a slot-based SBFD window is defined based at least in part on a start indicator and at least one of a length indicator or an end indicator, and a symbol-based SBFD window is defined based at least in part on a bitmap for one or more transition slots.

In a fifteenth aspect, alone or in combination with one or more of the first through fourteenth aspects, process 600 includes receiving an updated SBFD pattern indication that indicates an updated SBFD pattern for the SBFD resource, and identifying an updated time domain granularity and an updated frequency domain granularity for the SBFD resource based at least in part on the updated SBFD pattern indication.

In a sixteenth aspect, alone or in combination with one or more of the first through fifteenth aspects, the updated SBFD pattern indication is based at least in part on a reference sub-carrier spacing associated with a slot format indicator.

In a seventeenth aspect, alone or in combination with one or more of the first through sixteenth aspects, receiving the updated SBFD pattern indication comprises receiving downlink control information or a medium access control message that includes an indication of the updated SBFD pattern.

In an eighteenth aspect, alone or in combination with one or more of the first through seventeenth aspects, process 600 includes receiving a first value that is less than or equal to each of a plurality of values that correspond, respectively, to all SCS indications associated with all configured bandwidth parts of a serving cell, and receiving a second value that is less than or equal to a value of an SCS of the serving cell.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
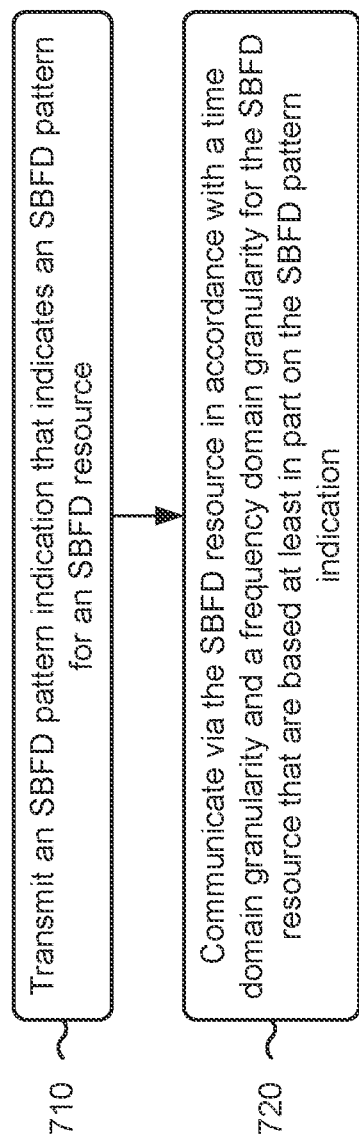
FIG. 7 is a diagram illustrating an example process performed, for example, by a network node, in accordance with the present disclosure.

FIG. 7 is a diagram illustrating an example process 700 performed, for example, by a network node, in accordance with the present disclosure. Example process 700 is an example where the network node (e.g., network node 110) performs operations associated with sub-band full-duplex granularity.

As shown in FIG. 7, in some aspects, process 700 may include transmitting an SBFD pattern indication that indicates an SBFD pattern for an SBFD resource (block 710). For example, the network node (e.g., using transmission component 904 and/or communication manager 906, depicted in FIG. 9) may transmit an SBFD pattern indication that indicates an SBFD pattern for an SBFD resource, as described above.

As further shown in FIG. 7, in some aspects, process 700 may include communicating via the SBFD resource in accordance with a time domain granularity and a frequency domain granularity for the SBFD resource that are based at least in part on the SBFD pattern indication (block 720). For example, the network node (e.g., using reception component 902, transmission component 904, and/or communication manager 906, depicted in FIG. 9) may communicate via the SBFD resource in accordance with a time domain granularity and a frequency domain granularity for the SBFD resource that are based at least in part on the SBFD pattern indication, as described above.

Process 700 may include additional aspects, such as any single aspect or any combination of aspects described below and/or in connection with one or more other processes described elsewhere herein.

In a first aspect, transmitting the SBFD pattern indication comprises transmitting a serving cell configuration common indication that includes the SBFD pattern indication and a time division duplexing configuration common indication, wherein the SBFD pattern is a semi-static SBFD pattern.

In a second aspect, alone or in combination with the first aspect, the time domain granularity is based at least in part on a reference SCS that is defined in the time division duplexing configuration common indication, and the frequency domain granularity is based at least in part on an SCS associated with a downlink band, an uplink band, and a guard band of the SBFD resource, wherein the SCS associated with the downlink band, the uplink band, and the guard band of the SBFD resource is different than an SCS of an active bandwidth part associated with a serving cell.

In a third aspect, alone or in combination with one or more of the first and second aspects, the time domain granularity is based at least in part on a time domain granularity indicated in the time division duplexing configuration common indication, and the frequency domain granularity is based at least in part on a sub-carrier spacing of an uplink sub-band or a downlink sub-band.

In a fourth aspect, alone or in combination with one or more of the first through third aspects, transmitting the SBFD pattern indication comprises transmitting a UE configuration that includes the SBFD pattern indication, wherein the SBFD pattern is a semi-static SBFD pattern.

In a fifth aspect, alone or in combination with one or more of the first through fourth aspects, the time domain granularity is based at least in part on a reference SCS that is defined in a time division duplexing configuration dedicated indication, and the frequency domain granularity is based at least in part on an SCS associated with a downlink band, an uplink band, and a guard band of the SBFD resource, wherein the SCS associated with the downlink band, the uplink band, and the guard band of the SBFD resource is different than an SCS of an active bandwidth part associated with a serving cell.

In a sixth aspect, alone or in combination with one or more of the first through fifth aspects, the time domain granularity is based at least in part on a time domain granularity indicated in a time division duplexing configuration dedicated indication, and the frequency domain granularity is based at least in part on a sub-carrier spacing of an uplink sub-band or a downlink sub-band.

In a seventh aspect, alone or in combination with one or more of the first through sixth aspects, the time domain granularity is based at least in part on a serving cell configuration, wherein an SCS associated with the SBFD resource is less than a bandwidth part SCS.

In an eighth aspect, alone or in combination with one or more of the first through seventh aspects, the SCS of the SBFD resource is not limited by an SCS indicated in a time division duplexing configuration common indication.

In a ninth aspect, alone or in combination with one or more of the first through eighth aspects, an SCS of the SBFD resource is greater than or equal to a reference SCS indicated in a time division duplexing configuration common indication.

In a tenth aspect, alone or in combination with one or more of the first through ninth aspects, the time domain granularity is based at least in part on a slot-based SBFD indication.

In an eleventh aspect, alone or in combination with one or more of the first through tenth aspects, the time domain granularity is based at least in part on a symbol-based SBFD indication.

In a twelfth aspect, alone or in combination with one or more of the first through eleventh aspects, the time domain granularity is based at least in part on a window that includes a slot-based SBFD indication and a symbol-based SBFD indication, wherein the window is based at least in part on a maximum number of switching points between time division duplexing resources and SBFD resources.

In a thirteenth aspect, alone or in combination with one or more of the first through twelfth aspects, a slot-based SBFD window is defined based at least in part on a start indicator and at least one of a length indicator or an end indicator, and a symbol-based SBFD window is defined based at least in part on another length indicator, wherein the symbol-based SBFD window begins at an end of the slot-based SBFD window.

In a fourteenth aspect, alone or in combination with one or more of the first through thirteenth aspects, a slot-based SBFD window is defined based at least in part on a start indicator and at least one of a length indicator or an end indicator, and a symbol-based SBFD window is defined based at least in part on a bitmap for one or more transition slots.

In a fifteenth aspect, alone or in combination with one or more of the first through fourteenth aspects, process 700 includes transmitting an updated SBFD pattern indication that indicates an updated SBFD pattern for the SBFD resource, wherein communicating via the SBFD resource in accordance with the time domain granularity and the frequency domain granularity comprises communicating via the SBFD resource in accordance with an updated time domain granularity and an updated frequency domain granularity for the SBFD resource that are based at least in part on the updated SBFD pattern for the SBFD resource.

In a sixteenth aspect, alone or in combination with one or more of the first through fifteenth aspects, the updated SBFD pattern indication is based at least in part on a reference sub-carrier spacing associated with a slot format indicator.

In a seventeenth aspect, alone or in combination with one or more of the first through sixteenth aspects, transmitting the updated SBFD pattern indication comprises transmitting downlink control information or a medium access control message that includes an indication of the updated SBFD pattern.

In an eighteenth aspect, alone or in combination with one or more of the first through seventeenth aspects, process 700 includes transmitting a first value that is less than or equal to a plurality of values that correspond, respectively, to all SCS indications associated with all configured bandwidth parts of a serving cell, and transmitting a second value that is less than or equal to a value of an SCS of the serving cell.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
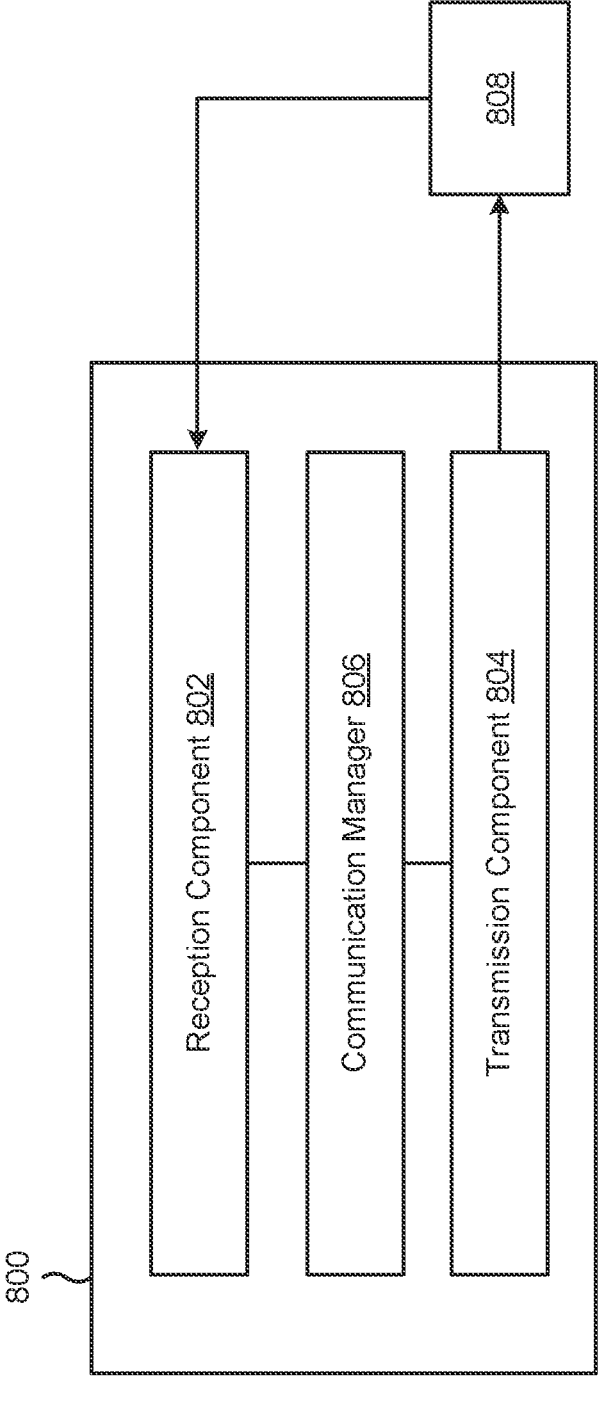
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication manager 140 described in connection with FIG. 1. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

The reception component 802 may receive an SBFD pattern indication that indicates an SBFD pattern for an SBFD resource. The communication manager 806 may identify a time domain granularity and a frequency domain granularity for the SBFD resource based at least in part on the SBFD pattern indication. The reception component 802 and/or the transmission component 804 may communicate via the SBFD resource in accordance with the time domain granularity and the frequency domain granularity.

The reception component 802 may receive an updated SBFD pattern indication that indicates an updated SBFD pattern for the SBFD resource. The communication manager 806 may identify an updated time domain granularity and an updated frequency domain granularity for the SBFD resource based at least in part on the updated SBFD pattern indication. The reception component 802 may receive a first value that is less than or equal to each of a plurality of values that correspond, respectively, to all SCS indications associated with all configured bandwidth parts of a serving cell. The reception component 802 may receive a second value that is less than or equal to a value of an SCS of the serving cell.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
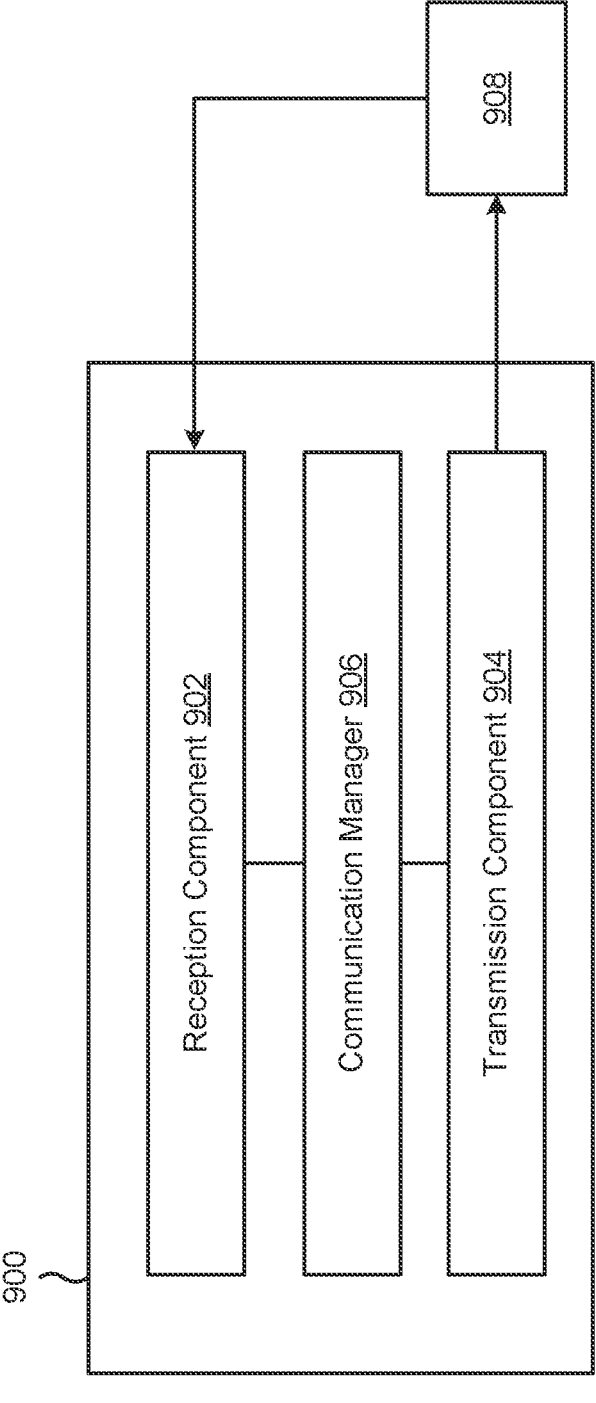
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 150 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2. In some aspects, the reception component 902 and/or the transmission component 904 may include or may be included in a network interface. The network interface may be configured to obtain and/or output signals for the apparatus 900 via one or more communications links, such as a backhaul link, a midhaul link, and/or a fronthaul link.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The transmission component 904 may transmit an SBFD pattern indication that indicates an SBFD pattern for an SBFD resource. The reception component 902 and/or the transmission component 904 may communicate via the SBFD resource in accordance with a time domain granularity and a frequency domain granularity for the SBFD resource that are based at least in part on the SBFD pattern indication.

The transmission component 904 may transmit an updated SBFD pattern indication that indicates an updated SBFD pattern for the SBFD resource, wherein communicating via the SBFD resource in accordance with the time domain granularity and the frequency domain granularity comprises communicating via the SBFD resource in accordance with an updated time domain granularity and an updated frequency domain granularity for the SBFD resource that are based at least in part on the updated SBFD pattern for the SBFD resource. The transmission component 904 may transmit a first value that is less than or equal to a plurality of values that correspond, respectively, to all SCS indications associated with all configured bandwidth parts of a serving cell. The transmission component 904 may transmit a second value that is less than or equal to a value of an SCS of the serving cell.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving a sub-band full-duplex (SBFD) pattern indication that indicates an SBFD pattern for an SBFD resource; identifying a time domain granularity and a frequency domain granularity for the SBFD resource based at least in part on the SBFD pattern indication; and communicating via the SBFD resource in accordance with the time domain granularity and the frequency domain granularity.

Aspect 2: The method of Aspect 1, wherein receiving the SBFD pattern indication comprises receiving a serving cell configuration common indication that includes the SBFD pattern indication and a time division duplexing configuration common indication, wherein the SBFD pattern is a semi-static SBFD pattern.

Aspect 3: The method of Aspect 2, wherein identifying the time domain granularity and the frequency domain granularity for the SBFD resource comprises: identifying the time domain granularity in accordance with a reference sub-carrier spacing (SCS) that is defined in the time division duplexing configuration common indication; and identifying the frequency domain granularity in accordance with an SCS associated with a downlink band, an uplink band, and a guard band of the SBFD resource, wherein the SCS associated with the downlink band, the uplink band, and the guard band of the SBFD resource is different than an SCS of an active bandwidth part associated with a serving cell of the UE.

Aspect 4: The method of Aspect 2, wherein identifying the time domain granularity and the frequency domain granularity for the SBFD resource comprises: identifying the time domain granularity in accordance with a time domain granularity indicated in the time division duplexing configuration common indication; and identifying the frequency domain granularity in accordance with a sub-carrier spacing of an uplink sub-band or a downlink sub-band.

Aspect 5: The method of any of Aspects 1-4, wherein receiving the SBFD pattern indication comprises receiving a UE configuration that includes the SBFD pattern indication, wherein the SBFD pattern is a semi-static SBFD pattern.

Aspect 6: The method of Aspect 5, wherein identifying the time domain granularity and the frequency domain granularity for the SBFD resource comprises: identifying the time domain granularity in accordance with a reference sub-carrier spacing (SCS) that is defined in a time division duplexing configuration dedicated indication; and identifying the frequency domain granularity in accordance with an SCS associated with a downlink band, an uplink band, and a guard band of the SBFD resource, wherein the SCS associated with the downlink band, the uplink band, and the guard band of the SBFD resource is different than an SCS of an active bandwidth part associated with a serving cell of the UE.

Aspect 7: The method of Aspect 5, wherein identifying the time domain granularity and the frequency domain granularity for the SBFD resource comprises: identifying the time domain granularity in accordance with a time domain granularity indicated in a time division duplexing configuration dedicated indication; and identifying the frequency domain granularity in accordance with a sub-carrier spacing of an uplink sub-band or a downlink sub-band.

Aspect 8: The method of Aspect 5, wherein identifying the time domain granularity and the frequency domain granularity for the SBFD resource comprises identifying the time domain granularity in accordance with a serving cell configuration, wherein a sub-carrier spacing (SCS) associated with the SBFD resource is less than a bandwidth part SCS.

Aspect 9: The method of Aspect 8, wherein the SCS of the SBFD resource is not limited by an SCS indicated in a time division duplexing configuration common indication.

Aspect 10: The method of Aspect 8, wherein an SCS of the SBFD resource is greater than or equal to a reference SCS indicated in a time division duplexing configuration common indication.

Aspect 11: The method of any of Aspects 1-10, wherein identifying the time domain granularity comprises identifying the time domain granularity in accordance with a slot-based SBFD indication.

Aspect 12: The method of any of Aspects 1-11, wherein identifying the time domain granularity comprises identifying the time domain granularity in accordance with a symbol-based SBFD indication.

Aspect 13: The method of any of Aspects 1-12, wherein identifying the time domain granularity comprises identifying the time domain granularity in accordance with a window that includes a slot-based SBFD indication and a symbol-based SBFD indication, wherein the window is based at least in part on a maximum number of switching points between time division duplexing resources and SBFD resources.

Aspect 14: The method of Aspect 13, wherein a slot-based SBFD window is defined based at least in part on a start indicator and at least one of a length indicator or an end indicator, and a symbol-based SBFD window is defined based at least in part on another length indicator, wherein the symbol-based SBFD window begins at an end of the slot-based SBFD window.

Aspect 15: The method of Aspect 13, wherein a slot-based SBFD window is defined based at least in part on a start indicator and at least one of a length indicator or an end indicator, and a symbol-based SBFD window is defined based at least in part on a bitmap for one or more transition slots.

Aspect 16: The method of any of Aspects 1-15, further comprising: receiving an updated SBFD pattern indication that indicates an updated SBFD pattern for the SBFD resource; and identifying an updated time domain granularity and an updated frequency domain granularity for the SBFD resource based at least in part on the updated SBFD pattern indication.

Aspect 17: The method of Aspect 16, wherein the updated SBFD pattern indication is based at least in part on a reference sub-carrier spacing associated with a slot format indicator.

Aspect 18: The method of Aspect 16, wherein receiving the updated SBFD pattern indication comprises receiving downlink control information or a medium access control message that includes an indication of the updated SBFD pattern, and wherein the method further comprises receiving a radio resource control message that includes an indication of a reference sub-carrier spacing (SCS) for the updated SBFD pattern.

Aspect 19: The method of Aspect 18, further comprising: receiving a first value that is less than or equal to each of a plurality of values that correspond, respectively, to all SCS indications associated with all configured bandwidth parts of a serving cell; and receiving a second value that is less than or equal to a value of an SCS of the serving cell.

Aspect 20: A method of wireless communication performed by a network node, comprising: transmitting a sub-band full-duplex (SBFD) pattern indication that indicates an SBFD pattern for an SBFD resource; and communicating via the SBFD resource in accordance with a time domain granularity and a frequency domain granularity for the SBFD resource that are based at least in part on the SBFD pattern indication.

Aspect 21: The method of Aspect 20, wherein transmitting the SBFD pattern indication comprises transmitting a serving cell configuration common indication that includes the SBFD pattern indication and a time division duplexing configuration common indication, wherein the SBFD pattern is a semi-static SBFD pattern.

Aspect 22: The method of Aspect 21, wherein the time domain granularity is based at least in part on a reference sub-carrier spacing (SCS) that is defined in the time division duplexing configuration common indication, and the frequency domain granularity is based at least in part on an SCS associated with a downlink band, an uplink band, and a guard band of the SBFD resource, wherein the SCS associated with the downlink band, the uplink band, and the guard band of the SBFD resource is different than an SCS of an active bandwidth part associated with a serving cell.

Aspect 23: The method of Aspect 21, wherein the time domain granularity is based at least in part on a time domain granularity indicated in the time division duplexing configuration common indication, and the frequency domain granularity is based at least in part on a sub-carrier spacing of an uplink sub-band or a downlink sub-band.

Aspect 24: The method of any of Aspects 20-23, wherein transmitting the SBFD pattern indication comprises transmitting a UE configuration that includes the SBFD pattern indication, wherein the SBFD pattern is a semi-static SBFD pattern.

Aspect 25: The method of Aspect 24, wherein the time domain granularity is based at least in part on a reference sub-carrier spacing (SCS) that is defined in a time division duplexing configuration dedicated indication, and the frequency domain granularity is based at least in part on an SCS associated with a downlink band, an uplink band, and a guard band of the SBFD resource, wherein the SCS associated with the downlink band, the uplink band, and the guard band of the SBFD resource is different than an SCS of an active bandwidth part associated with a serving cell.

Aspect 26: The method of Aspect 24, wherein the time domain granularity is based at least in part on a time domain granularity indicated in a time division duplexing configuration dedicated indication, and the frequency domain granularity is based at least in part on a sub-carrier spacing of an uplink sub-band or a downlink sub-band.

Aspect 27: The method of Aspect 24, wherein the time domain granularity is based at least in part on a serving cell configuration, wherein a sub-carrier spacing (SCS) associated with the SBFD resource is less than a bandwidth part SCS.

Aspect 28: The method of Aspect 27, wherein the SCS of the SBFD resource is not limited by an SCS indicated in a time division duplexing configuration common indication.

Aspect 29: The method of Aspect 27, wherein an SCS of the SBFD resource is greater than or equal to a reference SCS indicated in a time division duplexing configuration common indication.

Aspect 30: The method of any of Aspects 20-29, wherein the time domain granularity is based at least in part on a slot-based SBFD indication.

Aspect 31: The method of any of Aspects 20-30, wherein the time domain granularity is based at least in part on a symbol-based SBFD indication.

Aspect 32: The method of any of Aspects 20-31, wherein the time domain granularity is based at least in part on a window that includes a slot-based SBFD indication and a symbol-based SBFD indication, wherein the window is based at least in part on a maximum number of switching points between time division duplexing resources and SBFD resources.

Aspect 33: The method of Aspect 32, wherein a slot-based SBFD window is defined based at least in part on a start indicator and at least one of a length indicator or an end indicator, and a symbol-based SBFD window is defined based at least in part on another length indicator, wherein the symbol-based SBFD window begins at an end of the slot-based SBFD window.

Aspect 34: The method of Aspect 32, wherein a slot-based SBFD window is defined based at least in part on a start indicator and at least one of a length indicator or an end indicator, and a symbol-based SBFD window is defined based at least in part on a bitmap for one or more transition slots.

Aspect 35: The method of any of Aspects 20-34, further comprising transmitting an updated SBFD pattern indication that indicates an updated SBFD pattern for the SBFD resource, wherein communicating via the SBFD resource in accordance with the time domain granularity and the frequency domain granularity comprises communicating via the SBFD resource in accordance with an updated time domain granularity and an updated frequency domain granularity for the SBFD resource that are based at least in part on the updated SBFD pattern for the SBFD resource.

Aspect 36: The method of Aspect 35, wherein the updated SBFD pattern indication is based at least in part on a reference sub-carrier spacing associated with a slot format indicator.

Aspect 37: The method of Aspect 35, wherein transmitting the updated SBFD pattern indication comprises transmitting downlink control information or a medium access control message that includes an indication of the updated SBFD pattern, and wherein the method further comprises transmitting a radio resource control message that includes an indication of a reference sub-carrier spacing (SCS) for the updated SBFD pattern.

Aspect 38: The method of Aspect 37, further comprising: transmitting a first value that is less than or equal to a plurality of values that correspond, respectively, to all SCS indications associated with all configured bandwidth parts of a serving cell; and transmitting a second value that is less than or equal to a value of an SCS of the serving cell.

Aspect 39: An apparatus for wireless communication at a device, comprising a processor; memory coupled with the processor; and instructions stored in the memory and executable by the processor to cause the apparatus to perform the method of one or more of Aspects 1-38.

Aspect 40: A device for wireless communication, comprising a memory and one or more processors coupled to the memory, the one or more processors configured to perform the method of one or more of Aspects 1-38.

Aspect 41: An apparatus for wireless communication, comprising at least one means for performing the method of one or more of Aspects 1-38.

Aspect 42: A non-transitory computer-readable medium storing code for wireless communication, the code comprising instructions executable by a processor to perform the method of one or more of Aspects 1-38.

Aspect 43: A non-transitory computer-readable medium storing a set of instructions for wireless communication, the set of instructions comprising one or more instructions that, when executed by one or more processors of a device, cause the device to perform the method of one or more of Aspects 1-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors, coupled to the one or more memories, which are configured, individually or in any combination, to:

receive a configuration message, the configuration message comprising a sub-band full-duplex (SBFD) pattern indication that indicates an SBFD pattern for an SBFD resource;

identify a time domain granularity and a frequency domain granularity for the SBFD resource based at least in part on the SBFD pattern indication; and communicate one or more communications with a network node via the SBFD resource in accordance with the time domain granularity and the frequency domain granularity.

2. The UE of claim 1, wherein the one or more processors, to receive the SBFD pattern indication, are configured, individually or in any combination, to receive a serving cell configuration common indication that includes the SBFD pattern indication and a time division duplexing configuration common indication, wherein the SBFD pattern is a semi-static SBFD pattern.

3. The UE of claim 2, wherein the one or more processors, to identify the time domain granularity and the frequency domain granularity for the SBFD resource, are configured, individually or in any combination, to:

identify the time domain granularity in accordance with a reference sub-carrier spacing (SCS) that is defined in the time division duplexing configuration common indication; and identify the frequency domain granularity in accordance with an SCS associated with a downlink band, an uplink band, and a guard band of the SBFD resource, wherein the SCS associated with the downlink band, the uplink band, and the guard band of the SBFD resource is different than an SCS of an active bandwidth part associated with a serving cell of the UE.

4. The UE of claim 2, wherein the one or more processors, to identify the time domain granularity and the frequency domain granularity for the SBFD resource, are configured, individually or in any combination, to:

identify the time domain granularity in accordance with a time domain granularity indicated in the time division duplexing configuration common indication; and identify the frequency domain granularity in accordance with a sub-carrier spacing of an uplink sub-band or a downlink sub-band.

5. The UE of claim 1, wherein the one or more processors, to receive the SBFD pattern indication, are configured, individually or in any combination, to receive a UE configuration that includes the SBFD pattern indication, wherein the SBFD pattern is a semi-static SBFD pattern.

6. The UE of claim 5, wherein the one or more processors, to identify the time domain granularity and the frequency domain granularity for the SBFD resource, are configured, individually or in any combination, to:

identify the time domain granularity in accordance with a reference sub-carrier spacing (SCS) that is defined in a time division duplexing configuration dedicated indication; and identify the frequency domain granularity in accordance with an SCS associated with a downlink band, an uplink band, and a guard band of the SBFD resource, wherein the SCS associated with the downlink band, the uplink band, and the guard band of the SBFD resource is different than an SCS of an active bandwidth part associated with a serving cell of the UE.

7. The UE of claim 5, wherein the one or more processors, to identify the time domain granularity and the frequency domain granularity for the SBFD resource, are configured, individually or in any combination, to:

identify the time domain granularity in accordance with a time domain granularity indicated in a time division duplexing configuration dedicated indication; and identify the frequency domain granularity in accordance with a sub-carrier spacing of an uplink sub-band or a downlink sub-band.

8. The UE of claim 5, wherein the one or more processors, to identify the time domain granularity and the frequency domain granularity for the SBFD resource, are configured, individually or in any combination, to identify the time domain granularity in accordance with a serving cell configuration, wherein a sub-carrier spacing (SCS) associated with the SBFD resource is less than a bandwidth part SCS.

9. The UE of claim 8, wherein the SCS of the SBFD resource is not limited by an SCS indicated in a time division duplexing configuration common indication.

10. The UE of claim 8, wherein an SCS of the SBFD resource is greater than or equal to a reference SCS indicated in a time division duplexing configuration common indication.

11. The UE of claim 1, wherein the one or more processors, to identify the time domain granularity, are configured, individually or in any combination, to identify the time domain granularity in accordance with a slot-based SBFD indication.

12. The UE of claim 1, wherein the one or more processors, to identify the time domain granularity, are configured, individually or in any combination, to identify the time domain granularity in accordance with a symbol-based SBFD indication.

13. The UE of claim 1, wherein the one or more processors, to identify the time domain granularity, are configured, individually or in any combination, to identify the time domain granularity in accordance with a window that includes a slot-based SBFD indication and a symbol-based SBFD indication, wherein the window is based at least in part on a maximum number of switching points between time division duplexing resources and SBFD resources.

14. The UE of claim 13, wherein a slot-based SBFD window is defined based at least in part on a start indicator and at least one of a length indicator or an end indicator, and a symbol-based SBFD window is defined based at least in part on another length indicator, wherein the symbol-based SBFD window begins at an end of the slot-based SBFD window.

15. The UE of claim 13, wherein a slot-based SBFD window is defined based at least in part on a start indicator and at least one of a length indicator or an end indicator, and a symbol-based SBFD window is defined based at least in part on a bitmap for one or more transition slots.

16. The UE of claim 1, wherein the one or more processors are further configured to:

receive an updated SBFD pattern indication that indicates an updated SBFD pattern for the SBFD resource; and identify an updated time domain granularity and an updated frequency domain granularity for the SBFD resource based at least in part on the updated SBFD pattern indication.

17. The UE of claim 16, wherein the updated SBFD pattern indication is based at least in part on a reference sub-carrier spacing associated with a slot format indicator.

18. The UE of claim 16, wherein the one or more processors, to receive the updated SBFD pattern indication, are configured, individually or in any combination, to receive downlink control information or a medium access control message that includes an indication of the updated SBFD pattern, and wherein the one or more processors are further configured to receive a radio resource control message that includes an indication of a reference sub-carrier spacing (SCS) for the updated SBFD pattern.

19. The UE of claim 18, wherein the one or more processors are further configured to:

receive a first value that is less than or equal to each of a plurality of values that correspond, respectively, to all SCS indications associated with all configured bandwidth parts of a serving cell; and receive a second value that is less than or equal to a value of an SCS of the serving cell.

20. A network node for wireless communication, comprising:

one or more memories; and one or more processors, coupled to the one or more memories, which are configured, individually or in any combination, to:

transmit a configuration message, the configuration message comprising a sub-band full-duplex (SBFD) pattern indication that indicates an SBFD pattern for an SBFD resource; and communicate one or more communications with a user equipment via the SBFD resource in accordance with a time domain granularity and a frequency domain granularity for the SBFD resource that are based at least in part on the SBFD pattern indication.

21. The network node of claim 20, wherein the one or more processors, to transmit the SBFD pattern indication, are configured, individually or in any combination, to transmit a serving cell configuration common indication that includes the SBFD pattern indication and a time division duplexing configuration common indication, wherein the SBFD pattern is a semi-static SBFD pattern.

22. The network node of claim 21, wherein the time domain granularity is based at least in part on a reference sub-carrier spacing (SCS) that is defined in the time division duplexing configuration common indication, and the frequency domain granularity is based at least in part on an SCS associated with a downlink band, an uplink band, and a guard band of the SBFD resource, wherein the SCS associated with the downlink band, the uplink band, and the guard band of the SBFD resource is different than an SCS of an active bandwidth part associated with a serving cell.

23. The network node of claim 21, wherein the time domain granularity is based at least in part on a time domain granularity indicated in the time division duplexing configuration common indication, and the frequency domain granularity is based at least in part on a sub-carrier spacing of an uplink sub-band or a downlink sub-band.

24. The network node of claim 20, wherein the one or more processors, to transmit the SBFD pattern indication, are configured, individually or in any combination, to transmit a UE configuration that includes the SBFD pattern indication, wherein the SBFD pattern is a semi-static SBFD pattern.

25. The network node of claim 24, wherein the time domain granularity is based at least in part on a time domain granularity indicated in a time division duplexing configuration dedicated indication, and the frequency domain granularity is based at least in part on a sub-carrier spacing of an uplink sub-band or a downlink sub-band.

26. The network node of claim 24, wherein the time domain granularity is based at least in part on a serving cell configuration, wherein a sub-carrier spacing (SCS) associated with the SBFD resource is less than a bandwidth part SCS.

27. The network node of claim 20, wherein the time domain granularity is based at least in part on a slot-based SBFD indication, a symbol-based SBFD indication, or a window that includes a slot-based SBFD indication and a symbol-based SBFD indication.

28. The network node of claim 20, wherein the one or more processors are further configured to transmit an updated SBFD pattern indication that indicates an updated SBFD pattern for the SBFD resource, and wherein the one or more processors, to communicate via the SBFD resource in accordance with the time domain granularity and the frequency domain granularity, are configured, individually or in any combination, to communicate via the SBFD resource in accordance with an updated time domain granularity and an updated frequency domain granularity for the SBFD resource that are based at least in part on the updated SBFD pattern for the SBFD resource.

29. A method of wireless communication performed by a user equipment (UE), comprising:

receiving a configuration message, the configuration message comprising a sub-band full-duplex (SBFD) pattern indication that indicates an SBFD pattern for an SBFD resource;

identifying a time domain granularity and a frequency domain granularity for the SBFD resource based at least in part on the SBFD pattern indication; and communicating one or more communications with a network node via the SBFD resource in accordance with the time domain granularity and the frequency domain granularity.

30. A method of wireless communication performed by a network node, comprising:

transmitting a configuration message, the configuration message comprising a sub-band full-duplex (SBFD) pattern indication that indicates an SBFD pattern for an SBFD resource; and communicating one or more communications with a user equipment via the SBFD resource in accordance with a time domain granularity and a frequency domain granularity for the SBFD resource that are based at least in part on the SBFD pattern indication.

* * * * *